INVENTORS
SALVATORE FANCIULLO
RICHARD N. GAGNON
WARREN S. SUMMERS
Donald J. Bradley
BY ATTORNEY

ERROR DETECTOR

REFORMER FEED FLOW

United States Patent Office 3,745,047
Patented July 10, 1973

3,745,047
PROPORTIONAL ACTION ELECTRONIC FUEL CONTROL FOR FUEL CELLS
Salvatore Fanciullo, Plainville, Richard N. Gagnon, Glastonbury, and Warren S. Summers, Tolland, Conn., assignors to United Aircraft Corporation, East Hartford, Conn.
Filed Dec. 31, 1970, Ser. No. 103,246
Int. Cl. H01m 27/00
U.S. Cl. 136—86 B           10 Claims

ABSTRACT OF THE DISCLOSURE

A proportional electronic fuel control controls the feed flow of fuel to the reformer of a fuel cell system in response to fuel cell current, reformer temperature and the position of the fuel flow control valve. The electronic control produces a proportional control signal which actuates solenoids in a digital manner to regulate the position of the fuel flow control valve. A deadband is provided in the electronic control to prevent continuous cycling of the control valve.

BACKGROUND OF THE INVENTION

This invention relates to an electronic control system for fuel cells, and particularly to a proportional action electronic fuel control system to control the flow of fuel and thereby regulate fuel cell reformer temperature in accordance with the gross output current of the fuel cell.

A fuel cell is a device which directly converts chemical energy into electrical energy. In a fuel cell, normally a fuel and air or oxygen are supplied to spaced electron conductors which comprise electrodes where the release and acceptance of electrons occurs. An ion transfer medium which is capable of conducting an electrical charge separates the electrodes. On the fuel side of the cell, the fuel, normally hydrogen, diffuses through the electrode and hydrogen atoms are adsorbed on the surface of the fuel electrode in the form of atoms. These atoms typically react with the ion transfer medium to form water, and, in the process, give up electrons to the fuel electrode. The electrons flow through an external circuit to the oxidant electrode, and this flow constitutes the electrical output of the cell. The electron flow supports the oxidant half of the reaction. In the oxygen portion of the cell, oxygen diffuses through the oxygen electrode and is adosrbed on this electrode surface. The adsorbed oxygen and the inflowing electrons combine with the water in the ion transfer medium to form ions which complete the circuit by migrating through the ion transfer medium to the fuel electrode.

If the external circuit is open, the fuel electrode accumulates a surface layer of negative charges, and the oxidant electrode similarly accumulates a layer of positive charges. The presence of these accumulated electrical charges provides the electrical potential that forces electrons through the external circuit when the circuit is closed. The fuel cell is a demand system, and as the circuit is closed, the reaction will proceed at a moderate rate and the accumulated charges will be used at this rate. It is evident that both fuel and oxygen or air must be supplied to the respective electrodes so that current can be continuously supplied to the load in the external circuit. The precise details of fuel cell operation are well known to those skilled in the art, and need not be described in detail.

It is also known that to produce economical power on a large scale, fuel cells must utilize inexpensive fuels such as natural gas. Often the fuel is steam reformed to produce hydrogen in a package outside the fuel cell called the reformer.

Fuel cell systems typically maintain the desired cell electrical output by maintaining the operating temperature of the fuel cell at a desired level since the cell performance is a function of temperature. In typical fuel cells reactant pressures, humidity levels, electrolyte concentrations, flow rates, and other parameters may be monitored to keep the system operating under optimum conditions. Control systems for fuel cells are known in which fuel cell gross current and reformer operating temperature are monitored to regulate the feed flow to the reformer.

The present invention is an improvement on fuel cell control systems and controls the operating parameters so that temperature, hydrogen production, and fuel utilization are controlled much more efficiently than prior art systems.

SUMMARY OF THE INVENTION

In accordance with an embodiment of this invention, there is provided a proportional action electronic fuel control for fuel cells which controls fuel cell reformer temperature in accordance with the gross output current of the fuel cell. A primary advantage of the electronic control is that it implements a proportional fuel metering schedule using inherently low cost digital, on-off, techniques.

In the preferred embodiment of this invention, the electronic fuel control receives as input signals a gross fuel cell current signal, a reformer temperature signal, and a control valve position signal from the fuel flow control valve, and produces a control signal for the control valve in a predetermined manner in response to the input signals. The position of the control valve is varied to regulate the fuel flow to the reformer. The output from the electronic fuel control actuates a pair of solenoids in a digital, on-off, manner to vary the position of the control valve. A deadband is provided so that the control signal produced by the electronic fuel control will only change the position of the control valve if the deviation from the predetermined schedule exceeds a certain range.

The use of an electronic fuel control in a fuel cell system provides the advantage that all gains in the current, temperature and valve position feedback circuits are easily adjusted, thereby allowing the control to be easily adapted to a variety of different systems. Electronic circuitry lends itself easily to miniaturization such as production of the circuits on hybrid integrated circuit chip. The control system can also be located remote from the fuel cell.

In the present invention, a fuel such as natural gas and steam are fed to a variable area ejector where the rate of fuel flow to the reformer is regulated in response to the electronic fuel control. The steam and fuel are supplied to a catalytic reformer where the natural gas is steam reformed to produce hydrogen. The hydrogen is fed to the fuel cell where electric current is produced which will be used by a load. The electronic fuel control portion of this invention senses the gross current produced by the fuel cell, the temperature of the reformer, and the position of the ejector valve and produces a control signal which may be used to vary the position of the ejector valve if the flow of fuel to the reformer varies from the required amount. To control the ejector valve position, the electronic fuel control produces digital output signals which control the pressure in an actuator for the ejector valve. A deadband in the electronic fuel control provides a range from which the desired operation of the system must deviate before movement of the ejector valve is required.

DESCRIPTION OF THE PREFERRED EMBODIMENT

Figure 1:
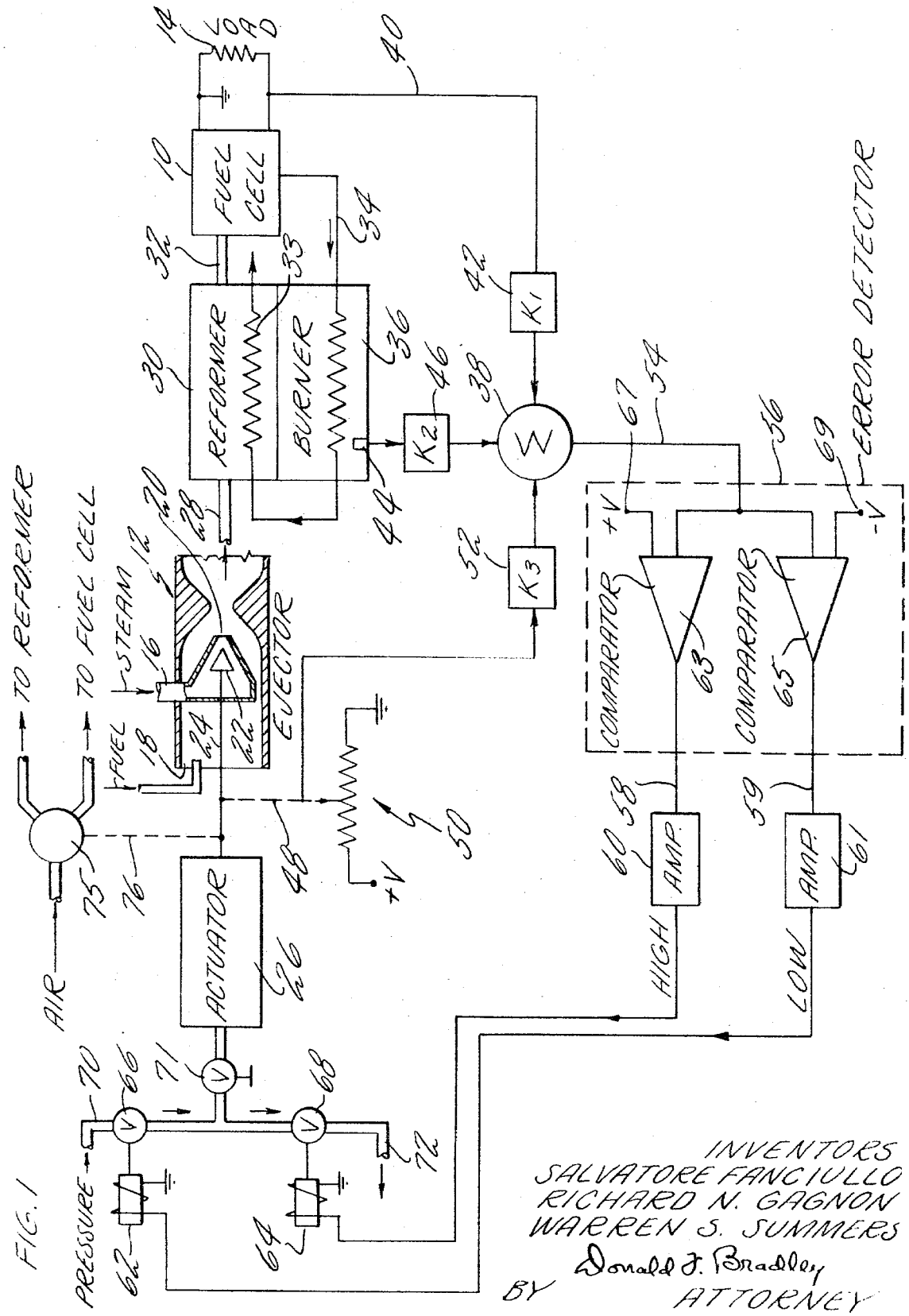
FIG. 1 is a diagrammatic view of a fuel cell system containing the electronic fuel control of this invention.

Referring particularly to FIG. 1, a fuel cell system utilizing a fuel such as natural gas is shown, the system embodying the features of the present invention. The fuel cell 10 has connected thereto an external load shown schematically as resistor 14 through which the electrons generated in the fuel cell are fed. While not shown, a typical fuel cell system contains a water supply which is converted to steam in a boiler, and the steam is ducted to an ejector 12 through a conduit 16. Steam is the primary flow of ejector 12. Fuel such as natural gas is fed through conduit 18 and mixed with the steam supply in ejector 12. The ejector is a variable area device in which the flow of steam therethrough, and consequently the flow of fuel, is determined by the area of nozzle 20 through which the steam passes. A plunger 22 connected through rod 24 is moved, as will be described, by actuator 26 to vary the area of nozzle 20 and thereby regulate the flow of steam and hence the flow of fuel through nozzle 20.

The mixture of steam and fuel is ducted through conduit 28 to reformer 30 where the natural gas fuel is steam reformed to hydrogen, carbon dioxide, carbon monoxide and certain residual water and methane. The steam-reformed fuel is then ducted through conduit 32 to the fuel electrode chamber of fuel cell 10. A separator or intermediate chemical reaction may be added to purify the fuel supply.

Generally, more fuel is circulated through fuel cell 10 than will be utilized in the fuel cell, and the excess of the circulated fuel is discharged from the cell and ducted through conduit 34 to a burner 36 attached to the reformer 30 where the fuel effluent is mixed with air supplied to the burner 36. This mixture is combusted in the burner 36 for the purpose of supplying heat for the reforming reaction. The burner exhaust gases are ducted to a heat exchanger 33 in reformer 30 for the purpose of conserving waste heat.

The fuel cell is a demand system, and the reformer 30 must replenish the fuel supply at the fuel electrode. A selected amount of fuel is supplied to the fuel cell, and the excess is ducted to the burner in the reformer. If the supply is below that required by the fuel cell and the reformer, an insufficient amount of fuel effluent will be passed by the fuel cell to the reformer, thereby causing the reformer temperature to decrease. On the other hand, if the excess fuel from the fuel cell is too great, the burner temperature increases.

The present system controls the flow of fuel to reformer 30, and hence the supply of hydrogen to fuel cell 10, by use of electronic circuitry which responds to three different fuel cell system operating parameters and produces a control signal which is eventually fed to actuator 26 to control the area of ejector nozzle 20 in order to maintain the steam and fuel flow through the ejector at the proper value. The three parameters which are sensed are gross fuel cell current, reformer temperature, and the position of the ejector control valve. Signals which are a function of these three parameters are fed through proper gains to a summing network 38 in which the parameters are combined in response to predetermined equations to produce the control signal which is fed to actuator 26.

Equation 1 describes the overall controlling action of the electronic fuel control and the computation which occurs in summing network 38.

Equation 1: $K_1 I - K_2 T - K_3 P = K_o$ where:

I = gross fuel cell current
T = reformer temperature
P = control valve position
$K_1$ = constant to scale fuel cell gross current signal
$K_2$ = constant to scale reformer burner temperature signal
$K_3$ = constant to scale control valve position signal, and
$K_o$ = an arbitrary constant, i.e., an offset adjustment to set the operating point of the control.

Referring to FIG. 1, a lead 40 is attached to load 14 to sense the gross fuel cell current fed to load 14. The gross current signal is fed through line 40 and through gain $K_1$ in block 42 to summing network 38.

The reformer temperature is sensed by a sensor such as a thermocouple 44 in reformer 36, and an electrical signal proportional to temperatures fed through gain $K_2$ shown in block 46 to summing network 38.

The position of the control valve in ejector 12 is indicated by, for example, a wiper arm 48 attached to rod 24 and movable in response to movement of the ejector control valve by the actuator 26 across potentiometer 50 to produce an electrical signal indicative of control valve position. This position signal is fed through gain $K_3$ in block 52 to summing network 38. Other position indicating devices which produce an electrical signal may be used.

Figure 2:
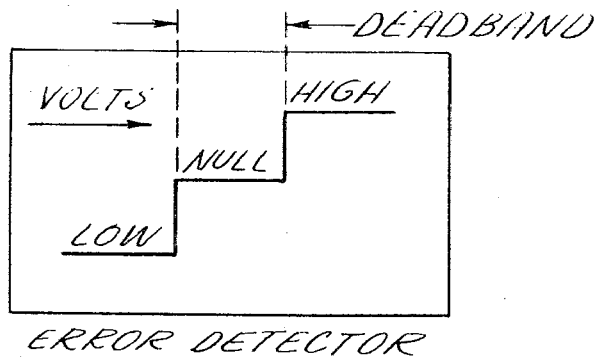
FIG. 2 shows the operation of the error detector circuits of FIG. 1.

The summing network 38 sums the scaled gross current signal, the scaled reformer temperature signal, and the scaled control valve position signal and produces a control signal in accordance with Equation 1. The control signal is fed through line 54 to an error detector 56 shown in dotted lines which contains a deadband. FIG. 2 shows in graph form the operation of the error detector. If the control signal on line 54 falls within the deadband, that is, does not exceed either a predetermined high or low value, no corrective action is taken by the fuel control. If the control signal exceeds either the high or low values of the deadband in error detector 56, an error signal is generated within the error detector as will be explained in detail, the error signal being fed through lines 58 or 59 to one of blocks 60 or 61 which contain electronic driver amplifiers. The error signal will be produced on line 58 if the control signal is above the deadband and will produce a closing signal for the ejector valve. If the control signal is too low, an error signal occurs on line 59 and an opening signal for the ejector valve is produced. The amplifiers 60 and 61 are operative in response to the presence of an error signal, and are connected respectively to solenoids 62 and 64 to provide actuation of actuator 26 in the proper direction to increase or decrease the flow of fuel through ejector 12 by varying the area of nozzle 20 by virtue of movement of plunger 22.

Shown within error detector 56 are a pair of comparator circuits 63 and 65, each of which receives the control signal from the summing network 38 and compares the control signal to a reference voltage supplied at terminals 67 and 69. Terminal 67 has applied thereto a voltage higher than the voltage applied to terminal 69, the difference between the voltages determining the width of the deadband. The reference voltages may be adjustable. A control signal which exceeds the voltage at terminal 67 or is lower than the voltage at terminal 69 will cause the respective comparator circuits to generate an output signal which is applied to one of the amplifiers. When a signal is indicated that is outside the deadband, the proper power amplifier is actuated to drive one of the solenoids 62 or 64. Other types of error detector circuitry may be used as is apparent to those skilled in the art.

Summing network is shown as a single block, but may contain a plurality of electronic circuits. For example, to perform the functions defined by Equation 1, the fuel cell load current signal may be compared with the temperature signal, and the difference therebetween compared in a separate circuit with the valve position feedback signal to produce the control signal on line 54. It is anticipated, however, that the summing network functions will be combined in a single circuit chip.

Actuator 26 is shown as being pressure actuated, but electrical operation of the actuator by means of proper integrator motor connections may also be used. As illustrated, solenoids 62 and 64, when actuated by amplifiers 60 or 61, will operate valves 66 and 68 in such a manner as to cause actuator 26 to receive a pressure signal from a source of pressure, not shown, to move rod 24 and vary the area of a nozzle and ejector 12 the proper amount. The pressure source is fed through conduit 70 and through valve 66 into actuator 26. A signal from the amplifier and solenoid selection logic portion 60 of the electronic fuel control will produce a signal at solenoid 62 to open valve 66 and cause an increase in pressure in actuator 26 when it is desired to vary the area of nozzle and ejector 12 in one direction. Variation of the nozzle of ejector 12 in the other direction is caused by actuation of solenoid 64 which opens valve 68 and causes the pressure in actuator 26 to be vented through conduit 72. Valves 66 and 68 are not simultaneously open.

A throttle valve 71 may be connected in the actuator pressure line to control the rate at which the actuator moves, and thereby vary the integration rate of the system. Incorporation of valve 71 also permits use of a narrower deadband for more accurate control.

Actuator 26 integrates the pressure signals received as a result of actuation of solenoids 62 or 64 by the electronic fuel control, and a change in pressure in actuator 26 changes the valve position in ejector 12 to readjust the set point of the ejector. This changes the amount of fuel and steam flowing into reformer 30, and causes changes in the signals from the feedback potentiometer 50 and from thermocouple 44 which are fed to summing network 38. This will cause a change in the control signal at line 54. If the control signal is within the deadband of error detector 56, no further changes will take place in the system. However, if the control signal is still outside the null point of the error detector, further changes will occur in the position of the ejector valve. Eventually, null is reached.

Air is required in both reformer 30 and fuel cell 10 as is known in the art, and independent controls are generally provided to regulate the air flow. A novel aspect of the present system is a variable area valve 75 connected to rod 24 through linkage 76. Air from a source, not shown, is fed to valve 75 to be directed to reformer 30 and fuel cell 10 as required. The position of the valve is modulated in response to the position of rod 24, which is a function of the fuel being fed to the reformer through ejector 12, to vary the amount of air passing through valve 75. While not shown, the air to the reformer may be diverted to the burner 36 via a shift converter and a shift converter bypass line. Air is passed through the shift converter for cooling purposes, and is also used to support combustion in the burner. A typical air source is a blower driven by an electric motor. Typically the ejector 12, actuator 26 and air control valve 75 are linked in a common package, with the feedback potentiometer 50 a part of the package.

The fuel control varies reformer temperature on a schedule proportional to fuel cell gross current. The schedule may be linear or non-linear. The response of the fuel control to the control signal on line 54 is such as to position the ejector in proportion to the difference between the load current and reformer temperature control signals and the null deadband in error detector 56. The proportional action of the fuel control is accomplished through the feedback of the valve position by means of potentiometer 50. This feedback signal limits the excursion of the valve in ejector 12 to a distance proportional to the difference between the load current and reformer temperature control signals and the null deadband in error detector 56. Scale factor constant $K_3$ in block 52 scales the valve position signal and determines the response of the actuator 26 to a high or low control signal. In normal operation, a change in the gross current signal causes either a high or low control signal at line 54 to which the control valve and ejector 12 responds until a null condition is obtained. At this point the control valve in ejector 12 has moved to a position which may have over-corrected for the high or low error signal. If the temperature of the reformer 30 is allowed to stabilize with the ejector control valve in this position, the desired operating point of the system would be exceeded. Under actual operating conditions, the temperature of the reformer 30 slowly responds to changes in the control valve position causing the control signal in line 54 to unbalance the temporary null condition, and as the temperature responds to the control signal, the position of ejector control valve converges on the correct position to operate reformer 30 at a temperature according to a schedule with the fuel cell gross current.

Figure 3:
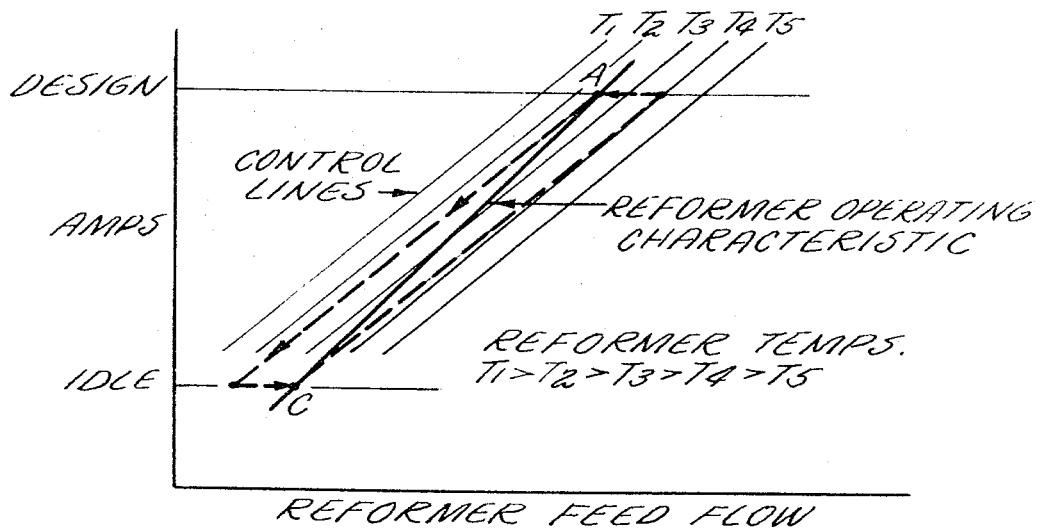
FIG. 3 is a graphical presentation of the effect of gross current and reformer temperature on reformer feed flow.

The flow of fuel into the reformer 30, being a mixture of steam and natural gas, is scheduled by the fuel control system to increase with gross current as shown in FIG. 3. This figure shows reformer feed flow, which is directly proportional to the position of the control valve in ejector 12, as a function of fuel cell gross current. Lines T1, T2, T3, T4 and T5 represent gross current and reformer feed control lines, where each line is biased to a different reformer operating temperature. At a given fuel cell current, reformer feed flow is increased by decreased reformer temperature. The range of temperature is from T1 to T5 are all acceptable for reformer operation. For example, T1 may equal 1500° F., while T5 may equal 1400° F. The reformer may operate anywhere within this range of temperatures, but must operate acording to line A–C to operate at peak efficiency.

Line A–C of FIG. 3 represents a typical reformer operating characteristic. A given feed flow will support a given fuel cell current. Current is directly related to hydrogen consumption since the reaction of each hydrogen molecule releases a fixed number of electrons. Therefore, line A–C is representative of the fuel cell hydrogen consumption versus the reformer feed flow, which is an operating characteristic of the particular reformer unit.

Operation to the right-hand side of line A–C represents an excess of reformer feed flow resulting in the rise of reactor temperature. Conversely, operation to the left of line A–C represents an insufficient feed flow causing a drop in reactor temperature. A rise in reactor temperature causes, through the electronic fuel control, a decease in feed flow. A drop in reactor temperature causes, through the control, an increase in feed flow. A balance is achieved when reformer feed flow intersects the reformer operating characteristic line.

Specific details of reformer feed flow characteristics and a detailed discussion of design characteristics may be found in copending application Ser. No. 776,959, entitled "Reformer Fuel Flow Control" filed Nov. 19, 1968 in the name of Elliot I. Waldman. In summary, at a given gross current, the system is designed so that as reformer temperature decreases, the feed flow will increase to provide a greater excess of fuel not utilized in the fuel cell to be rejected and combusted in the burner to restore the reformer to the desired temperature level.

FIG. 3 also shows that feed flow settings are achieved through monitoring of gross current. For large changes in gross current, large changes in reformer feed flow occur. The amount of readjustment required in the system is a function of the shape of the reformer operating characteristic line, and the accuracy of the gross current control. Reformer feed can be controlled over its full operating range by temperature bias alone, although with less response then can be achieved with gross current in addition, and with far less response than can be achieved by the proportional feedback control of the present invention. The combination of the gross current, temperature and valve position feedback provides both response and a positioning accuracy which cannot be achieved with temperature biasing alone, or with temperature and gross current biasing.

The novel features of the present control are the use of electrical circuits to provide proportional action and produce a proportional fuel metering schedule using digital, on-off, techniques. The feedback gains in the electronic portion of the fuel control are easily adjusted, making the control adaptable to various applications. Electronics lends itself easily to miniaturization, since the circuits may be produced on a hybrid integrated circuit chip. The electronic portions of the circuits can be located remote from the temperatures from the fuel cell. Specific circuit components have not been disclosed since design of individual circuits will depend on specific size and power levels in the fuel cell and the temperatures involved, the desired speed of response of the system, and other specific characteristics of the system.

Although this invention has been disclosed in a preferred embodiment thereof, it will be apparent to those skilled in the art that numerous changes may be made in the design and construction of the individual components without departing from the scope of the invention as hereinafter claimed.

We claim:

1. A fuel cell system comprising
a variable area ejector having a control valve for metering a primary flow of steam and mixing the primary flow with a secondary fuel feed for the reformer, the ejector valve being positioned in response to a control signal for adjusting the feed flow through said ejector,
a reformer disposed downstream of said ejector, said reformer having burner means including an inlet for burning a mixture of air and fuel effluent gases therein to heat the feed flow from said ejector passing through said reformer,
a fuel cell disposed downstream of said reformer and receiving the steam-reformed fuel from said reformer,
conduit means for conveying fuel effluent gases from said fuel cell to said burner inlet,
a load connected to said fuel cell and receiving current therefrom,
means for sensing the fuel cell current supplied by said fuel cell to said load and producing a current signal which is a function thereof,
means for sensing the temperature of the reformer and producing a temperature signal which is a function thereof,
means for sensing the position of the ejector control valve and producing a position signal which is a function thereof,
summing means receiving said current signal, said temperature signal and said position signal and producing therefrom a control signal,
and means responsive to said control signal for varying the position of the ejector control valve to vary the flow of steam and fuel therethrough.

2. A system as in claim 1 and including an error detector connected to receive said control signal and having high and low control signal limits separated by a deadband, said valve being varied only when said control signal exceeds the limits of said deadband.

3. A system as in claim 2 in which said error detector comprises first and second comparator circuits, each of said circuits being connected to receive said control signal, and a source of reference voltage for each of said comparator circuits, one of said reference voltages being greater in magnitude than the other reference voltage, the voltage difference between said reference voltages defining the limits of said deadband.

4. A system as in claim 2 and including an actuator responsive to a control signal outside said deadband for varying said valve setting.

5. A system as in claim 4 and including solenoid means responsive to the occurrence of a control signal outside said deadband for actuating said actuator.

6. A system as in claim 5 and including amplifier means responsive to a control signal outside said deadband to provide an on-off control signal to said solenoid means.

7. A system as in claim 1 and including a source of air for said reformer and said fuel cell, and means responsive to the position of said variable area ejector control valve for varying the flow of air to said reformer and said fuel cell.

8. A fuel cell system comprising
a variable area ejector having a control valve for metering a primary flow of steam and mixing the primary flow with a secondary fuel feed for the reformer, the ejector valve being positioned in response to a control signal for adjusting the feed flow through said ejector,
a reformer disposed downstream of said ejector, said reformer having burner means including an inlet for burning a mixture of air and fuel effluent gases therein to heat the feed flow from said ejector passing through said reformer,
a fuel cell disposed downstream of said reformer and receiving the steam-reformed fuel from said reformer,
conduit means for conveying fuel effluent gases from said fuel cell to said burner inlet,
a load connected to said fuel cell and receiving current therefrom,
means for sensing the fuel cell current supplied by said fuel cell to said load and producing a current signal which is a function thereof,
means for sensing the temperature of the reformer and producing a temperature signal which is a function thereof,
means for sensing the position of the ejector control valve and producing a position signal which is a function thereof,
summing means receiving said current signal, said temperature signal and said position signal and producing therefrom a control signal,
an error detector circuit receiving said control signal and having high and low control signal limits separated by a deadband, an error signal being generated by said error detector circuit only when said control signal exceeds one of said limits,
means responsive to the occurrence of said error signal for generating an actuating signal,
an actuator for varying the position of said ejector control valve,
and means responsive to said actuating signal for actuating said actuator to thereby cause the steam and fuel flow through said ejector to be varied.

9. A system as in claim 8 and including first and second solenoids connected with said actuator, energization of one of said solenoids producing actuation of said actuator to cause an increase in fuel flow through said ejector, energization of the other of said solenoids producing actuation of said actuator to cause a decrease in fuel flow through said ejector, and means including an amplifier circuit for each of said solenoids and responsive to said error signal for energizing one of said first or second solenoids.

10. A system as in claim 9 and including a source of pressure for actuating said actuator, and valve means responsive to energization of said solenoids for varying the pressure fed to said actuator.

References Cited

UNITED STATES PATENTS 3,585,077 11/1968 Waldman _____ 136—86 B
3,585,078 11/1968 Sederquist et al. ____ 136—86 B WINSTON A. DOUGLAS, Primary Examiner H. A. FEELEY, Assistant Examiner U.S. Cl. X.R.

136—86 C